No. 715,558. Patented Dec. 9, 1902.
H. G. DAVIS.
BOTTLE CAPPING MACHINE.
(Application filed July 25, 1902.)
(No Model.) 5 Sheets—Sheet 1.

Witnesses. Harry G. Davis.
Inventor,
By Att'ys Seymour & Earle

No. 715,558. Patented Dec. 9, 1902.
H. G. DAVIS.
BOTTLE CAPPING MACHINE.
(Application filed July 25, 1902.)
(No Model.) 5 Sheets—Sheet 2.
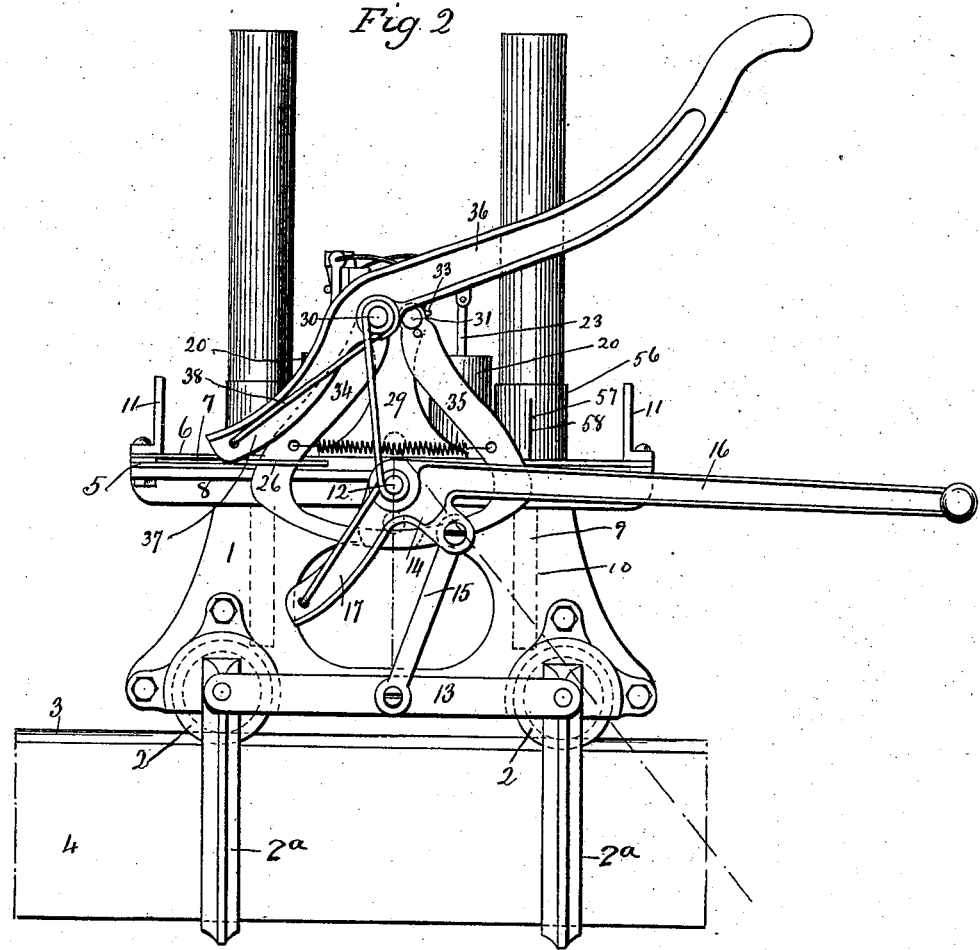
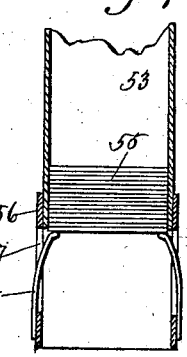
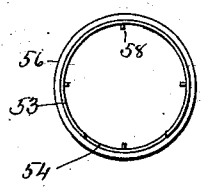

No. 715,558. Patented Dec. 9, 1902.
H. G. DAVIS.
BOTTLE CAPPING MACHINE
(Application filed July 25, 1902.)
(No Model.) 5 Sheets—Sheet 3.
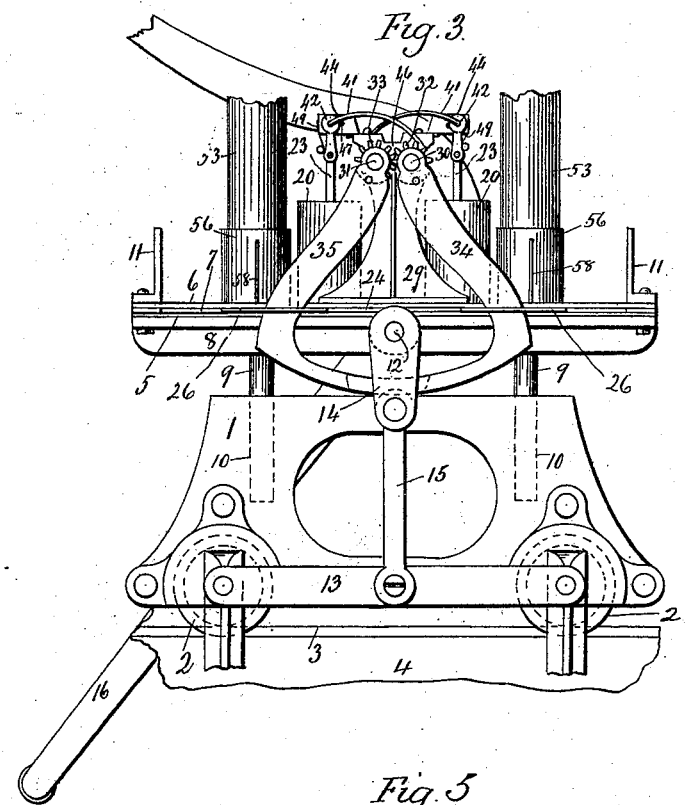
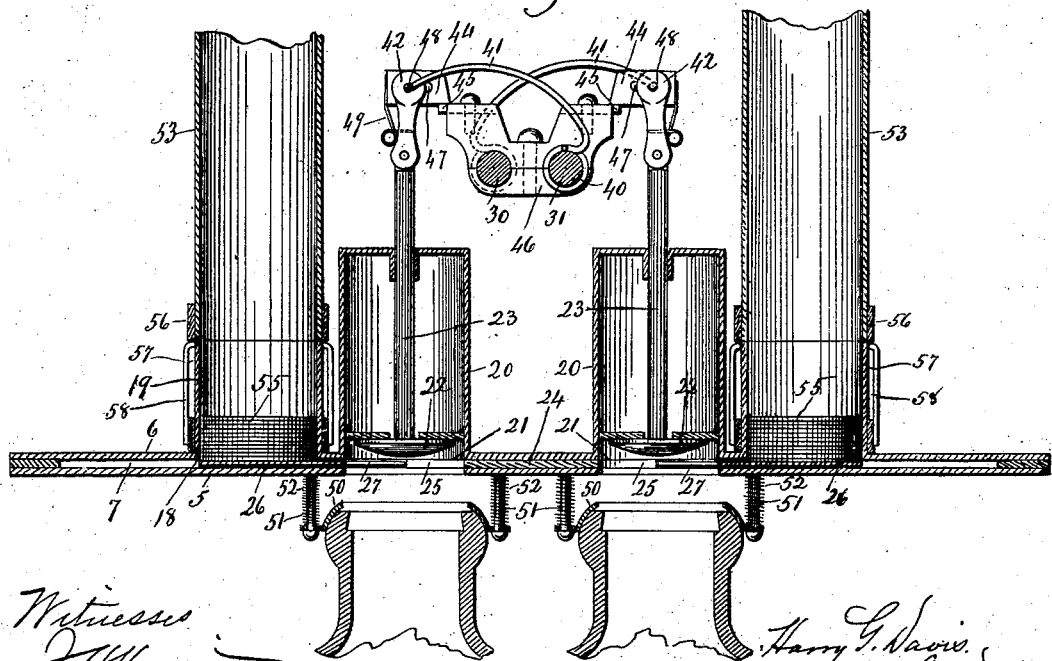

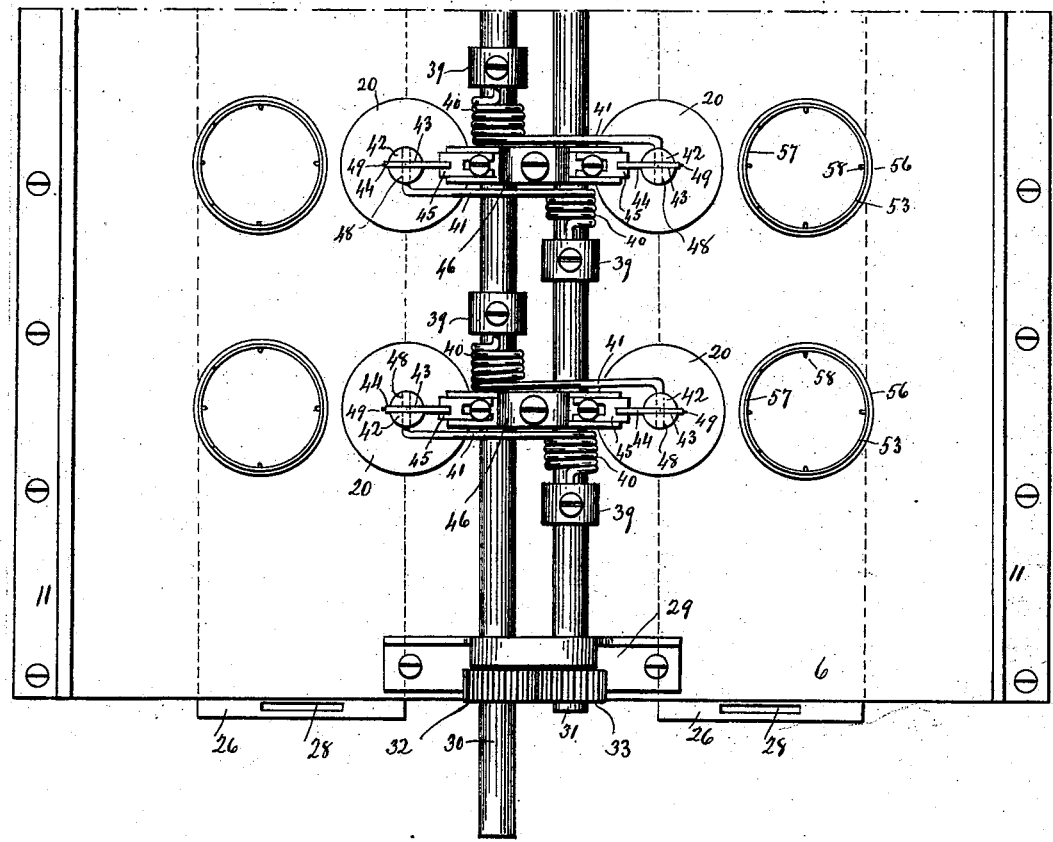

No. 715,558. Patented Dec. 9, 1902.
H. G. DAVIS.
BOTTLE CAPPING MACHINE.
(Application filed July 25, 1902.)
(No Model.) 5 Sheets—Sheet 5.

UNITED STATES PATENT OFFICE.

HARRY G. DAVIS, OF NORWALK, CONNECTICUT.

BOTTLE-CAPPING MACHINE.

SPECIFICATION forming part of Letters Patent No. 715,558, dated December 9, 1902.

Application filed July 25, 1902. Serial No. 117,006. (No model.)

*To all whom it may concern:*

Be it known that I, HARRY G. DAVIS, of Norwalk, in the county of Fairfield and State of Connecticut, have invented a new and useful Improvement in Bottle-Capping Machines; and I do hereby declare the following, when taken in connection with the accompanying drawings and the figures of reference marked thereon, to be a full, clear, and exact description of the same, and which said drawings constitute part of this specification, and represent, in—

Figure 1:
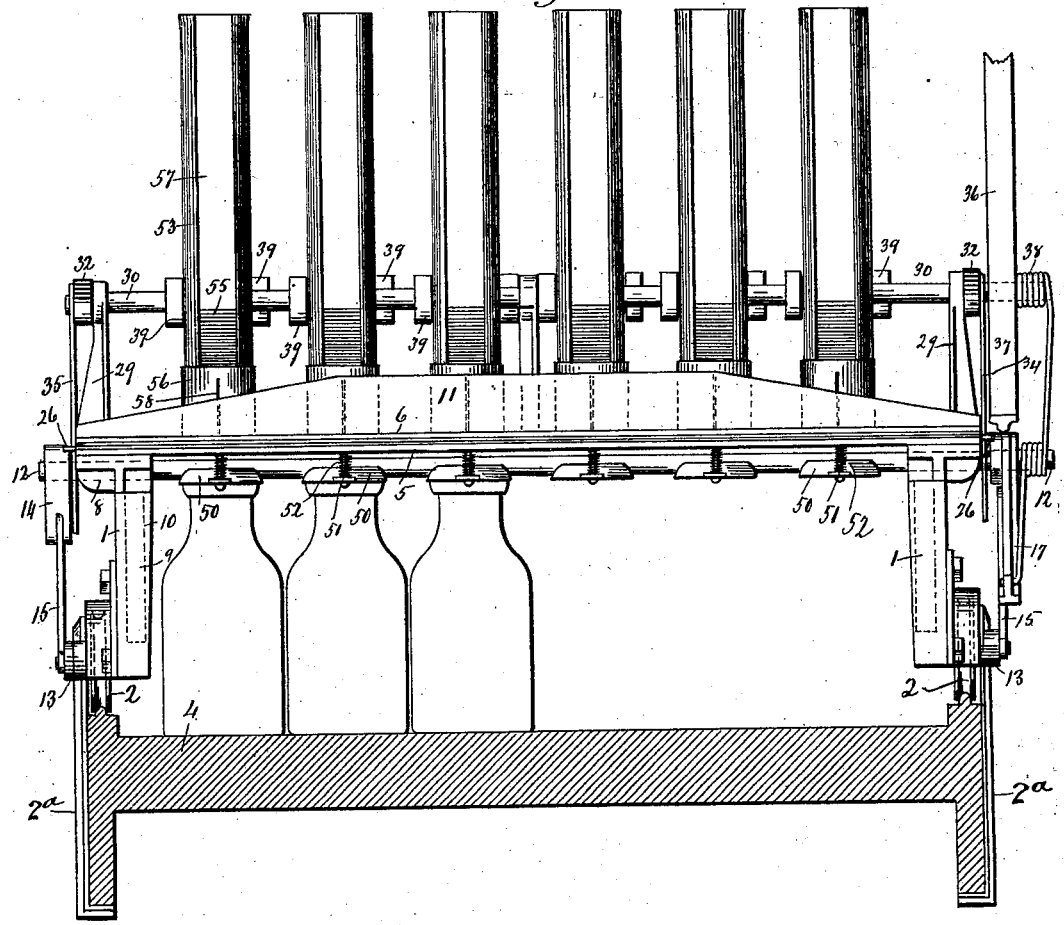
Figure 6:
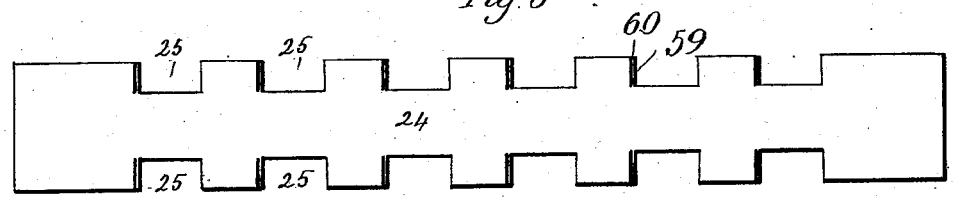
Figure 7:
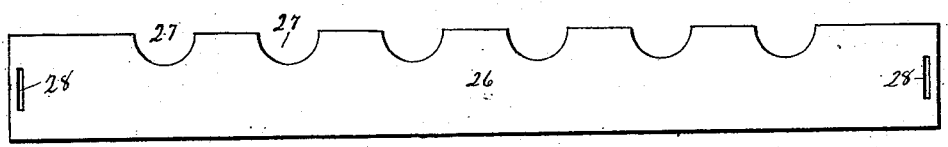
Figure 12:
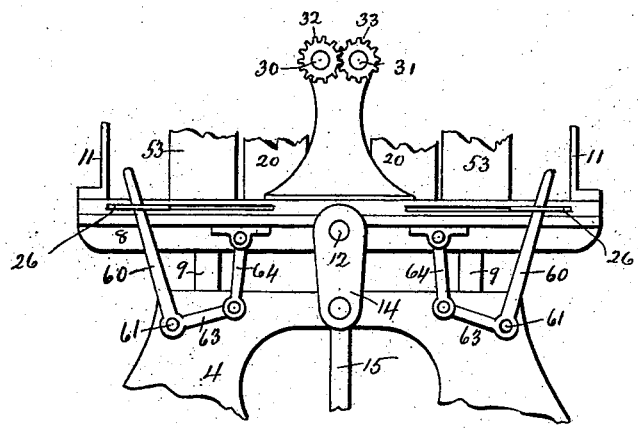
Figure 11:
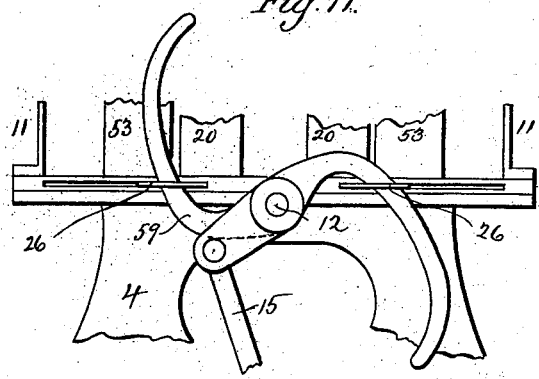

Figure 1, a front view of a machine constructed in accordance with my invention and adapted to cap twelve bottles; Fig. 2, a view in end elevation of the same; Fig. 3, a view in end elevation of the opposite end of the machine from that shown in Fig. 2 and with the plates in an elevated position; Fig. 4, a broken top or plan view of one end of the machine, showing four plungers and corresponding magazine-tubes; Fig. 5, a sectional view through the plunger-chambers, magazines, and rock-shafts, showing adjacent portions of the plunger-operating mechanism in end view; Fig. 6, a top or plan view of the central notched plate; Fig. 7, a top or plan view of one of the disk slides; Fig. 8, a side view of one of the magazines detached; Fig. 9, an enlarged sectional view of the lower end thereof; Fig. 10, an under side view of the same, Figs. 9 and 10 being enlarged; Fig. 11, an end view showing a modified means for operating the slides; Fig. 12, a broken end view showing another modification of the means for operating the slides.

This invention relates to an improvement in bottle-capping machines, and is an improvement on the invention for which Letters Patent of the United States No. 670,783 were granted to me March 26, 1901, and which related to a device for inserting disks of paper or other suitable material into the mouths of milk and cream bottles. In that patent it is intimated that a series of devices might be arranged in line, so as to cap a number of bottles at the same time; and the object of this invention is the production of a machine embodying features of my prior patent which will be capable of capping a number of bottles at the same time; and the invention consists in the construction, as hereinafter described, and particularly recited in the claims. In practice the machine will be adapted to cap sixteen bottles; but for clearness I have illustrated a machine arranged to cap only twelve.

In carrying out my invention I employ a carriage consisting of sides 1, supported on rollers 2, which are adapted to roll upon tracks 3, arranged on the upper edges of a bottle-supporting frame 4. In order to hold the carriage on the track, depending arms 2ª are provided, the lower ends of which extend beneath the frame 4.

The capping device proper, like that shown in my prior patent, consists of a lower plate 5 and a top plate 6, arranged to provide an open space 7 between them. The plates are secured at their ends to the tops of bars 8, from which pins 9 depend into vertical openings 10, formed in the sides 1 of the carriage. To the top of the plates at the front and back are braces 11, the bars 8 and braces 11 forming substantially a rectangular frame. Projecting from the center of the bars 8 are trunnions 12, which are connected with bars 13, secured to the sides of the carriage by links 14 15, the upper link 14 having an operating-handle 16 and a forwardly-projecting end 17. In the plate 6 are a series of openings 18, a longitudinal row being arranged on each side of the center of the machine, and extending upwardly from these openings are flanges 19, which are adapted to receive magazine-tubes, as will be hereinafter described. Adjacent to these openings 18 and between the rows on opposite sides of the center are plunger-chambers 20, which are arranged over holes 21, which extend through both the plates 5 6 and within these chambers are plungers 22, mounted at the lower ends of spindles 23, which project upward through the tops of the chambers.

Located centrally between the plates 5 and 6 and between the rows of openings 18 is a plate 24, having square notches 25 in opposite sides, which notches correspond in position to the position of the holes 21 in the plates 5 6. Also located between the plates 5 6 and so as to pass beneath the openings 18 in the plate 6 are slides 26, formed at their inner edges with semicircular notches 27, and the ends of these slides project beyond the plates 5 6 and are formed in their projecting ends with slots 28.

Extending upward at opposite ends of the frame are brackets 29, which support at their upper ends rock-shafts 30 31, which are provided, respectively, with gears 32 33, so as to turn together. Carried by opposite ends of these rock-shafts are cam-levers 34 35, which extend through the slots 28 in the slide 26, and on the shaft 30 is mounted an operating-handle 36, having forwardly-projecting ends 37, to which one end of a spring 38 is attached, the spring extending around the shaft 30, thence down around the trunnion 12 and into engagement with the projecting end 17 of the link 14 and tending to return the operating-handles 16 and 36 to their normal positions. At various points on the rock-shafts 30 31 collars 39 are fixed, and connected with these collars are springs 40, having long arms 41, which extend outward on opposite sides into engagement with heads 42, pivoted to the upper ends of the spindles 23, and in slots 43 in the upper ends of these heads 42 are dogs 44, which project inward, and so as to rest upon shoulders 45, arranged on clips 46, which are carried by the rock-shafts 30 31, and these shoulders are longitudinally adjustable, so as to retain the dogs and place the springs under greater or less tension, so that when released the plungers will descend with more or less force. These dogs are formed with slots 47, through which the pivots 48 extend, so that the dogs are permitted a certain longitudinal movement, and the heads also carry springs 49, which extend upward into engagement with the rear ends of said dogs and tend to force them inward. As bottles vary in height, it will be apparent that the movement of the plungers must also vary, and this variation is permitted by the arms 41 of the springs, which are more or less yielding, so that when one or more plungers are checked by tall bottles the springs will yield and allow the other plungers to continue, so as to insert the caps in shorter bottles. To further adapt the machine to variations in the heights of bottles to be filled, and so that the plates when lowered will properly engage with the bottles to be filled, I arrange a series of collars 50 below the holes 21, which collars are connected with the plate 5 by pins 51, on which are springs 52, the tendency of which is to depress the collars, yet permit them to be elevated vertically on pins 51.

The magazines which carry the disks each consist of a tube 53, preferably having a slot 54 in one side for convenience of access to the disks 55, placed therein. At the lower end of the tube is a sleeve 56, corresponding in internal diameter to the external diameter of the tube 53, and in this sleeve are slots 57, into which spring-fingers 58 extend, the fingers being adapted to extend into the path of the under side of the disks 55, as clearly shown in Fig. 9. The sleeves 56 of the tubes are set over the flanges 19, which correspond both in internal and external diameter to the respective diameters of the tube 53, and as the sleeve 58 passes over the flange 19 the upper edge of the flange forces the spring-fingers 58 outward and permits the disks 55 in the tube 53 to drop down through the holes 18 in the plate 6 and so as to rest upon the upper surface of the plate 5, directly in the path of the slides 26. As there is a possibility of a slight variation in the disks, owing to the roughness of the edges and in order to hold them in position, I preferably form the edges of the notches 25 in the plate 24 with spring-fingers 59, which are formed by sawing a narrow slit 60 in one side of the notches 25, as clearly shown in Fig. 6.

The operation of the machine is as follows: The bottles to be filled will be arranged upon the frame 4 and the carriage 1 moved so that the collars 50 will stand in line with the bottles. When thus located, the handle 16 will be raised, permitting the plates to descend, as shown in Fig. 2, in which position the collars 50 rest upon the upper ends of the bottles to be filled, the collars yielding to variation in heights of the bottles and centering the bottles under the holes. When thus located, the handle 36 will be turned, which turns the rock-shafts 30 31, and these in turn through the arms 41 of the springs 40 depress the spindles 23 and force the plungers 12 downward. Owing to the engagement, however, of the dogs 44 with the shoulders 45, they will remain in their elevated position until the spring 40 shall have been placed under the desired tension, and when the holding power of the dogs shall have been overcome they will slip off the shoulders 45 and the plungers forced downward and the disks pressed into the mouths of the bottles, the force with which the plungers are depressed depending upon the length of time the dogs are held in engagement with the shoulders, and this time is varied by moving the shoulders outward or inward. The return movement of the handle 36 forces the slides forward from beyond the mouths of the magazine, so as to carry another disk from each magazine into the path of the plungers, and as the spindles rise the dogs slide on their pivots and readily pass the shoulder 45, over which they slip when the spindles reach the limit of the upward movement, the mechanism being so timed that the slide will not move the disks from the magazine until the plungers have been raised. It will thus be seen that a number of bottles are simultaneously capped. When this capping operation is completed, the handle 16 will be depressed to raise the plates and so as to lift the collars 50 out of engagement with the bottles, when the carriage may be moved in one direction or the other over another series of bottles, and the operation may be repeated.

Instead of mounting the levers 34 35 upon the rock-shafts 30 31 an S-shaped lever 59 may be mounted on the trunnion 12 and so as to be turned by the handle 16, the opposite ends of the cam-arms extending through the slots 28 of the slides 26, as clearly shown in Fig. 11, or bell-crank levers 60 might be mounted on pivots 61 at opposite sides of the carriage, one arm of the levers extending upward through the slots 28 in the slides 26 and the other arms 63 connected by links 64 with the lower side of the bars 8 and so that when the plates are raised or lowered these levers will be turned so as to move the slides back and forth, as clearly shown in Fig. 12. I would therefore have it understood that the invention is not limited to the exact details of construction shown, but hold myself at liberty to make such changes and alterations therein as fairly fall within the spirit and scope of my invention.

Having fully described my invention, what I claim as new, and desire to secure by Letters Patent, is—

1. In a machine for capping bottles, the combination with the carriage, of plates arranged above the same and vertically movable with relation thereto, a series of plungers adapted to pass through holes in said plates, magazines arranged adjacent to said plungers and opening into space between said plates, slides arranged between said plates and projecting beyond the ends thereof, cam-levers for moving said slides to pass disks from said magazine into the path of said plungers, and means for depressing said plungers, substantially as described.

2. In a machine for capping bottles, the combination with the plungers thereof, of spindles projecting upwardly therefrom, heads pivotally connected to said spindles, longitudinally-arranged rock-shafts and springs carried thereby and engaging with the heads of said spindles, dogs mounted in said head and adapted to engage with shoulders mounted on said rock-shafts, and means for rotating said rock-shafts, whereby the plungers are depressed, substantially as described.

3. In a bottle-capping machine, the combination with the carriage thereof, of two plates mounted above the carriage and connected therewith by links, whereby the plates may be raised and lowered, pins depending from said plates and extending into openings in the carriage, whereby the plates are guided, rock-shafts mounted above said plates, holes through said plates, and plungers arranged over said holes and adapted to pass therethrough, magazines arranged above said plates and opening through the upper one, slides for transferring disks from said magazine into the path of said plungers, connections between said shafts and plungers, and means for rotating said shafts, whereby said plungers are depressed and the slides moved, substantially as described.

4. In a bottle-capping machine, the combination with the upper plate thereof having openings through it, of flanges surrounding said openings, magazines adapted to set over said collars and comprising a tube with a sleeve at its lower end, slots in said sleeve, and springs extending through said slots into the path of said disk, said sleeves adapted to set over said flanges which force the springs outward and release the disks in the tubes, substantially as described.

5. In a machine for capping bottles, the combination with the plates thereof, through which the plungers pass, of a centrally-arranged plate between said plungers and having notches corresponding in position to the holes through which the plungers pass, the edges of said plate slitted adjacent to the notches whereby spring-fingers are formed at one side of the notches, substantially as described.

In testimony whereof I have signed this specification in the presence of two subscribing witnesses.

HARRY G. DAVIS.

Witnesses:
FREDERIC C. EARLE,
FRANK R. PERRY.